Aug. 29, 1961   J. H. NEWHOUSE   2,998,288
PISTON
Filed Dec. 30, 1959

INVENTOR.
JAMES H. NEWHOUSE
BY
ATTORNEY

United States Patent Office

2,998,288
Patented Aug. 29, 1961

2,998,288
PISTON
James H. Newhouse, Battle Creek, Mich., assignor to Clark Equipment Company, a corporation of Michigan
Filed Dec. 30, 1959, Ser. No. 862,960
12 Claims. (Cl. 309—4)

This invention relates to improvements in pistons, and more particularly to improvements in piston constructions for power cylinders.

The primary object of the invention is to provide an improved piston head construction for use in power cylinders.

Another object of the invention is to provide a piston head construction which requires the use of only a single sealing means for preventing leakage of fluid through the piston head.

A further object of the invention is to provide a generally improved piston head construction which is compact in construction, can be easily assembled, and which accepts loads applied thereto in a novel manner.

Other objects and advantages of the invention will appear from the detailed description which follows taken in conjunction with the drawing wherein.

In carrying out the invention I have provided a construction which is adapted to utilize an improved sealing arrangement between the piston rod and cylinder wall, and which utilizes a split ring construction associated with an annular groove in the piston rod whereby to resist in a novel manner pressure loading applied to the piston head across a section of the piston rod.

Figure 1:
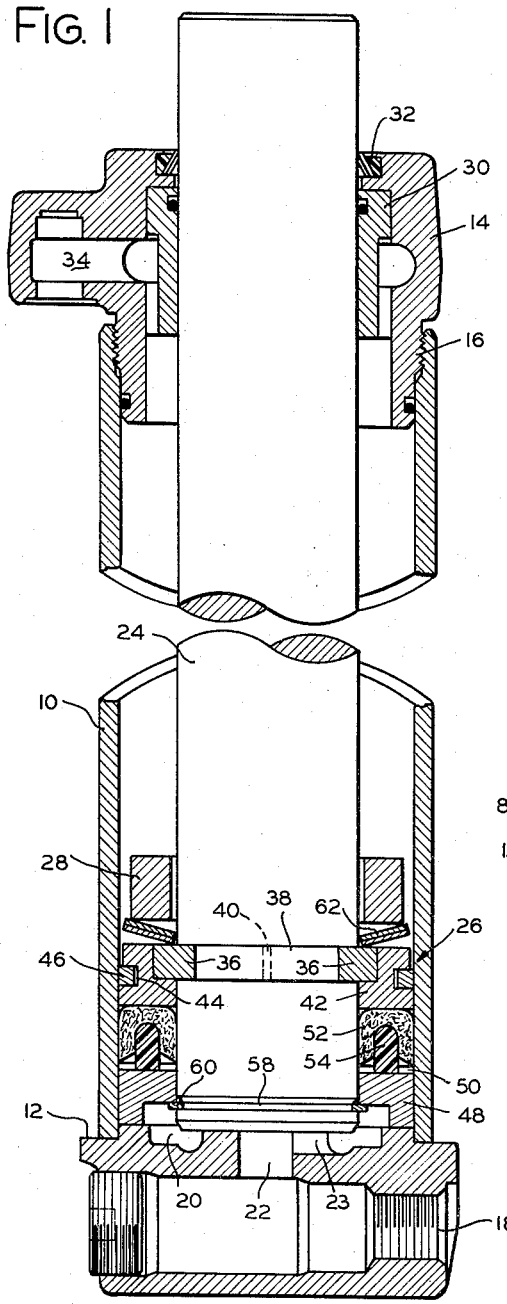
FIGURE 1 illustrates in cross-section one embodiment of my invention.

Referring now to FIGURE 1, a cylinder is illustrated at numeral 10 having a cylinder head 12 secured at the head end thereof and a cylindrical cap 14 threadedly connected at 16 with the cylinder at the gland end thereof. The cylinder 10, as illustrated, is of the single-acting type wherein head member 12 includes a passage 18 communicating with the cylinder chamber 20 by way of a port 22 and a plurality of passageways 23, said passage receiving pressure fluid from a source, not shown, for actuating a piston rod 24 with a piston head construction, indicated generally at numeral 26, outwardly of cylinder 10 until an annular stop member 28 abuts the lower end of cap 14. Cap 14 is of known construction; it includes an annular piston rod bearing and guide element 30 and a wiper ring 32. A passage 34 is formed in a radial extension thereof which is adapted to be connected with a conduit, not shown, for venting the upper end of the single-acting cylinder.

The piston head construction 26 is associated in fixed relation to piston rod 24 by means of a pair of semi-annular elements 36 located in registry with a circumferential groove 38 formed adjacent to the lower end of rod 24. Elements 36 preferably do not completely surround groove 38, as illustrated by the gap at numeral 40 between the terminal ends of elements 36. This arrangement simplifies the manufacturing process in making noncritical the circumferential tolerance which applies to elements 36. An annular member 42 having a cross-section as illustrated is adapted to register with the lower end of the piston rod and to be moved to the position shown adjacent groove 38 wherein the L-shaped inner section abuts the one side and the periphery of elements 36. A circumferential groove 44 contains a wiper ring 46 which wipes clean the cylinder wall during each stroke of the piston.

Axially spaced from annular member 42 is a second cup-shaped annular member 48 which forms therewith a chamber 50 in which is located an annular sealing element 52 of U-shaped cross-section and receiving in the pocket thereof a resilient wedging member 54 which preferably has merely an abutting connection with member 48, but which may be suitably bonded to the one side of member 48, if desired. The width of element 54 is preferably slightly larger than the width of the pocket of the U-shaped seal 52 so that upon registry of the wedging element with the annular sealing member the outer and inner peripheries of element 52 are forced into sealing relation with the cylinder wall and the piston rod, respectively. A groove 58 is formed adjacent the end of the piston rod for receiving a snap ring 60, or equivalent means, which is preferably spaced axially of groove 38 in relation to the axial dimensions of the other parts of the assembly so as to maintain the entire piston head assembly 26 under slight compression whereby to assure the continuous fixed relation of the parts in operation. Interposed between stop member 28 and elements 36 is a spring washer 62 which is adapted to cushion the impact of abutment between the stop member and the lower end of cap member 14 upon full extension of the piston rod.

Figure 2:
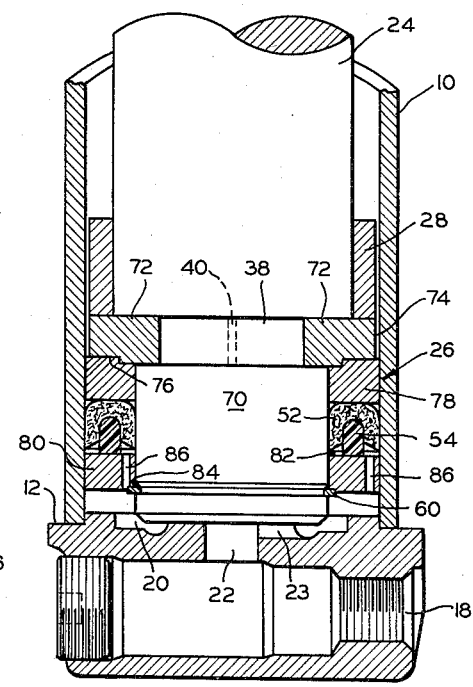
FIGURE 2 illustrates in cross-section a modification of the FIGURE 1 construction.

Referring now to FIGURE 2, a modified construction is illustrated wherein like parts have been numbered the same as in FIGURE 1. In the modification the main portion of piston rod 24 is of larger diameter relative to the cylinder diameter than it is in FIGURE 1. However, the lower portion 70 of the piston rod has a smaller diameter than the main portion of the rod, as shown. The circumferential groove 38 is interposed between the large and small diameter portions of the piston rod. A pair of semi-annular elements 72 are located in the groove of the rod and preferably provide a small clearance 74 with the cylinder wall. A circumferential recess 76 is provided in the one side of elements 72 for receiving a complementary circumferential projection of a ring 78 which registers with the small diameter portion 70 of the rod and which forms with axially spaced ring 80 a chamber 82 containing sealing ring 52 and resilient wedging member 54 of similar configuration and function as like numbered parts in FIGURE 1. A pair of axially extending openings 86 are provided in element 80 for communicating pressure fluid from chamber 20 to chamber 82 in order to facilitate maintaining the various parts of the piston head assembly in fixed relationship during operation irrespective of variations in the cylinder chamber pressure. It will be noted that openings 86 are provided both radially inwardly and outwardly of the respective annular members to insure substantially instantaneous communication of pressure variations throughout chamber 82. Member 86 forms an annular notch 84 at the one inner corner thereof whereby to afford positive engagement with snap ring 60 which eliminates the possibility of accidental dislodgement of the snap ring from groove 58.

From the foregoing it will be seen that the provision of the split ring construction in association with the piston rod shoulders provided by groove 38 in both embodiments resists varying pressure forces applied to the piston and rod, whereby the snap ring 60 need merely function as a holding member for maintaining the various parts of the piston head in proper assembled and precompressed relation on the piston rod. Holding member 60 is therefore not required to function as a primary pressure force resisting element during operation. Also, my construction provides an arrangement whereby only a single sealing means is required between the cylinder wall and the piston rod to eliminate or minimize the flow of leakage fluid from the high to the low pressure side of the cylinder. In FIGURE 1 the L-shaped inner peripheral portion of member 42 provides a positive guide which assures proper assembled relation of the said member with the split rings 36, whereas in FIGURE 2 registry of the groove 76 and projecting portion of parts 72 and 78, respectively, assures the same result. Thus, it will be seen that the piston head and rod construction of my invention affords an extremely compact, easily assembled and generally improved construction.

Now, while I have shown and described what I believe to be preferred embodiments of the present invention, it will be understood that modifications may be made in the construction and arrangement of parts without departing from the spirit and scope of the invention.

I claim:

1. In combination, a cylinder, a reciprocable piston rod extending axially of the cylinder including a circumferential groove intermediate the ends thereof, and a piston head connected intermediate the ends of the piston rod including a pair of arcuate means of larger diameter than the piston rod in registry with said groove and abutting at least one side of said groove, an annular member spaced axially from said pair of arcuate means in registry with said piston rod and forming with said pair of arcuate means an annular chamber extending between the cylinder wall and the piston rod, and sealing means located in said chamber.

2. A combination as claimed in claim 1 wherein a pair of axially extending passageways are provided in said annular member for communicating pressure fluid to said chamber.

3. A combination as claimed in claim 1 wherein said sealing means is annular in form and abuts the piston rod along the inner periphery thereof and the cylinder wall along the outer periphery thereof.

4. A combination as claimed in claim 3 wherein said sealing means is of generally U-shaped cross-section, and an arcuate element connected to said annular member extending into the pocket formed by said sealing means for wedging the sides thereof into sealing relation with the cylinder and piston rod.

5. A combination as claimed in claim 3 wherein a holding member is connected peripherally of the piston rod adjacent to said annular member for holding the piston head assembly in fixed position relative thereto and for precompressing said sealing means.

6. In combination, a cylinder, a piston head assembly, a reciprocable piston rod extending axially of the cylinder through said piston head assembly and including a circumferential groove intermediate the ends thereof and adjacent one end of the piston head assembly, said piston head assembly being located intermediate the ends of the piston rod and including a pair of arcuate elements in registry with said groove, a first annular member abutting one side of said arcuate elements, said arcuate elements and said first annular member together forming a registrable portion such that the annular member is located on the piston rod in guided relation to the pair of arcuate elements, a second annular member spaced axially from the first annular member to form a chamber intermediate the said annular members, and sealing means located in said chamber.

7. A combination as claimed in claim 6 wherein said sealing means is annular and of generally U-shaped cross-section, and means connected to said second annular member extending into said chamber in registry with the pocket formed by the sealing means, whereby to maintain the legs of the sealing means in sealing relation with the surfaces forming the sides of the chamber.

8. A combination as claimed in claim 6 wherein a snap ring is mounted peripherally of the piston rod adjacent the one end of said second annular member for maintaining the piston head assembly in fixed assembled relation.

9. In combination, a cylinder, a reciprocable piston rod extending axially of the cylinder and including a circumferential groove intermediate the ends thereof, a piston head connected intermediate the ends of the piston rod including a pair of arcuate elements in registry with said groove having a combined outside diameter intermediate the diameters of the piston rod and the cylinder wall, a first annular member mounted on the piston rod in guided relation to the arcuate elements and containing a cylinder wall wiper ring, a second annular member spaced axially from the first annular member to form a chamber intermediate the said annular members, sealing means located in said chamber, and a holding member connected peripherally of the piston rod adjacent to said second annular member for maintaining the piston head in fixed assembled relation.

10. A combination as claimed in claim 1 wherein piston stop means are spaced axially of said pair of arcuate elements, and spring means are interposed between said stop means and said arcuate elements for cushioning the terminal portion of the piston rod stroke.

11. In combination, a cylinder, a reciprocable piston rod extending axially of the cylinder and including a circumferential groove intermediate the ends thereof and ton head connected intermediate the ends of the piston rod including a pair of arcuate elements in registry with said groove, said piston rod being of smaller diameter on the one side of said groove than on the opposite side thereof, a first annular member abutting the side of said arcuate elements adjacent the small diameter portion of the piston rod, a second annular member spaced axially from the first annular member in registry with the small diameter portion of the piston rod to form a chamber intermediate the said annular members, and sealing means located in said chamber.

12. In combination, a cylinder, a piston head assembly, a reciprocable piston rod extending axially of the cylinder through said piston head assembly and including a circumferential groove intermediate the ends thereof and adjacent one end of the piston head assembly, said piston head assembly being located intermediate the ends of the piston rod and including a pair of arcuate elements in registry with said groove, a first annular member abutting one side of said arcuate elements, said arcuate elements and said first annular member together forming a registrable portion such that the annular member is located on the piston rod in guided relation to the pair of arcuate elements, a second annular member spaced axially from the first annular member to form an annular chamber intermediate the first and second annular members extending radially from the piston rod to the cylinder wall, an annular sealing means of generally U-shaped cross-section located in said chamber, and means in registry with the pocket formed by the sealing means for spreading the legs thereof to establish a sealing relation with the piston rod and the cylinder wall.

References Cited in the file of this patent

UNITED STATES PATENTS

| | | |
|---|---|---|
| 2,815,004 | Droman | Dec. 3, 1957 |
| 2,825,590 | Sutherland | Mar. 4, 1958 |
| 2,853,347 | Cooper | Sept. 23, 1958 |

FOREIGN PATENTS

| | | |
|---|---|---|
| 1,022,818 | France | Dec. 24, 1952 |

UNITED STATES PATENT OFFICE
CERTIFICATE OF CORRECTION

Patent No. 2,998,288                                August 29, 1961

James H. Newhouse

It is hereby certified that error appears in the above numbered patent requiring correction and that the said Letters Patent should read as corrected below.

Column 4, lines 21 and 22, for "elements", each occurrence, read -- means --; same column 4, lines 26 and 27, for "and ton" read -- a piston --.

Signed and sealed this 9th day of January 1962.

(SEAL)
Attest:

ERNEST W. SWIDER                                        DAVID L. LADD
Attesting Officer                                          Commissioner of Patents